Aug. 13, 1963  J. K. HULBERT  3,100,539
HELICOPTER ROTOR BLADE
Filed Aug. 14, 1961  3 Sheets-Sheet 1
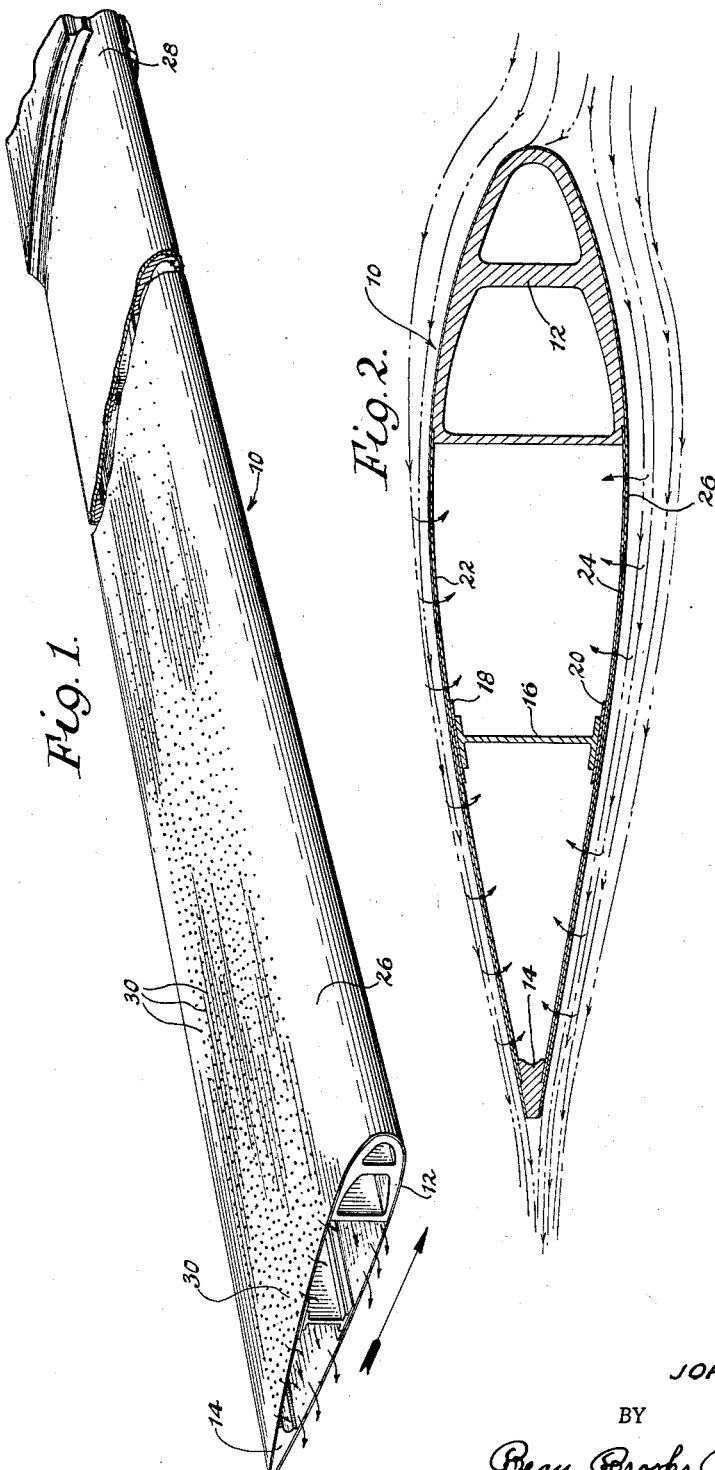
INVENTOR.
JOHN K. HULBERT
BY
Bean, Brooks, Buckley + Bean
ATTORNEYS INVENTOR
JOHN K. HULBERT
BY
Bean, Brooks, Buckley + Bean
ATTORNEYS

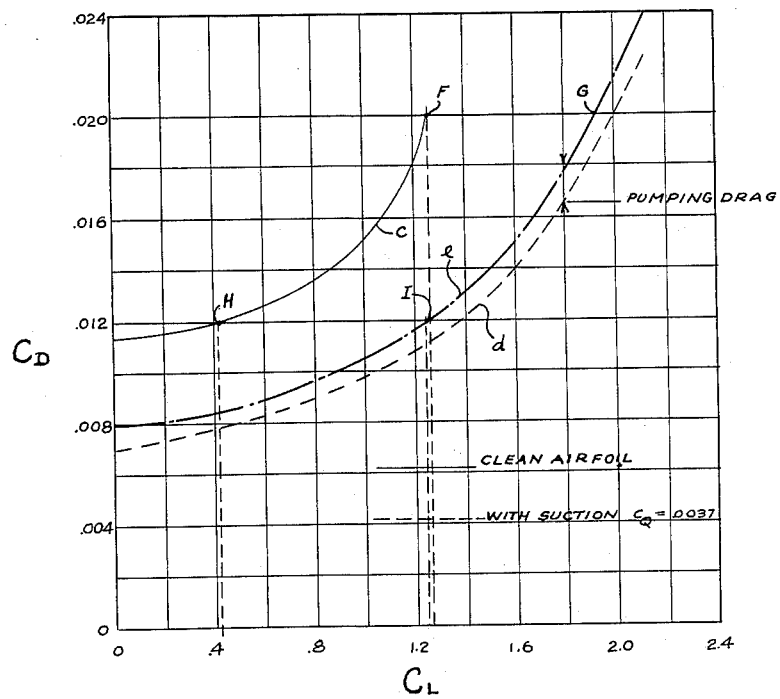

# United States Patent Office 3,100,539
Patented Aug. 13, 1963

3,100,539
HELICOPTER ROTOR BLADE
John K. Hulbert, Grand Island, N.Y., assignor to Bell
Aerospace Corporation, Wheatfield, N.Y.
Filed Aug. 14, 1961, Ser. No. 131,340
3 Claims. (Cl. 170—172)

This invention relates to helicopter rotor blades and in particular concerns the provision of certain improvements therein effecting superior performance.

In a helicopter rotor blade, the lift coefficient of the airfoil section of the blade acts as a limiting factor to forward flight speed. This occurs by reason of the fact that the retreating portion of the blade attains a stall condition wherever the forward flight speed exceeds a definite value. Since such stall condition will not occur simultaneously along the full length of the blade and since the limited forward flight speed will not occur until at least a portion of the blade (from the tip inwardly) has reached stall condition, it will be evident that at or near the limited forward flight speed, the blade will be subjected to forces giving rise to vibration and consequent fatigue loading of the blade.

It is therefore of primary concern in connection with the present invention to effect performance increase in helicopter rotor blades by such means as will increase the maximum lift coefficient while avoiding significant, if any, increase in blade weight and which so improves the performance characteristics thereof as to far exceed the power requirement therefor. Ancillary to the above, the present invention accomplishes reduction in rotor blade fatigue by materially eliminating retreating blade buffeting.

More specifically, it is an object of this invention to increase the lift coefficient of a helicopter rotor blade by boundary layer control specifically by bleeding in predetermined masses of air at various radial and chordwise areas of the blade by utilizing the naturally occurring negative pressure gradient present, from tip toward root, due to centrifugal action in a hollow rotor blade.

Other objects and advantages of the invention will appear from the description hereinbelow and the accompanying drawings wherein:

FIG. 1 is a perspective view of a rotor blade utilizing the principles of this invention;

FIG. 2 is an enlarged cross section taken through the blade of FIG. 1; and

FIGS. 3 and 4 are graphical representations of certain characteristics of the present invention, FIG. 4 showing for comparison purposes, corresponding characteristics of a conventional rotor.

Figure 3:
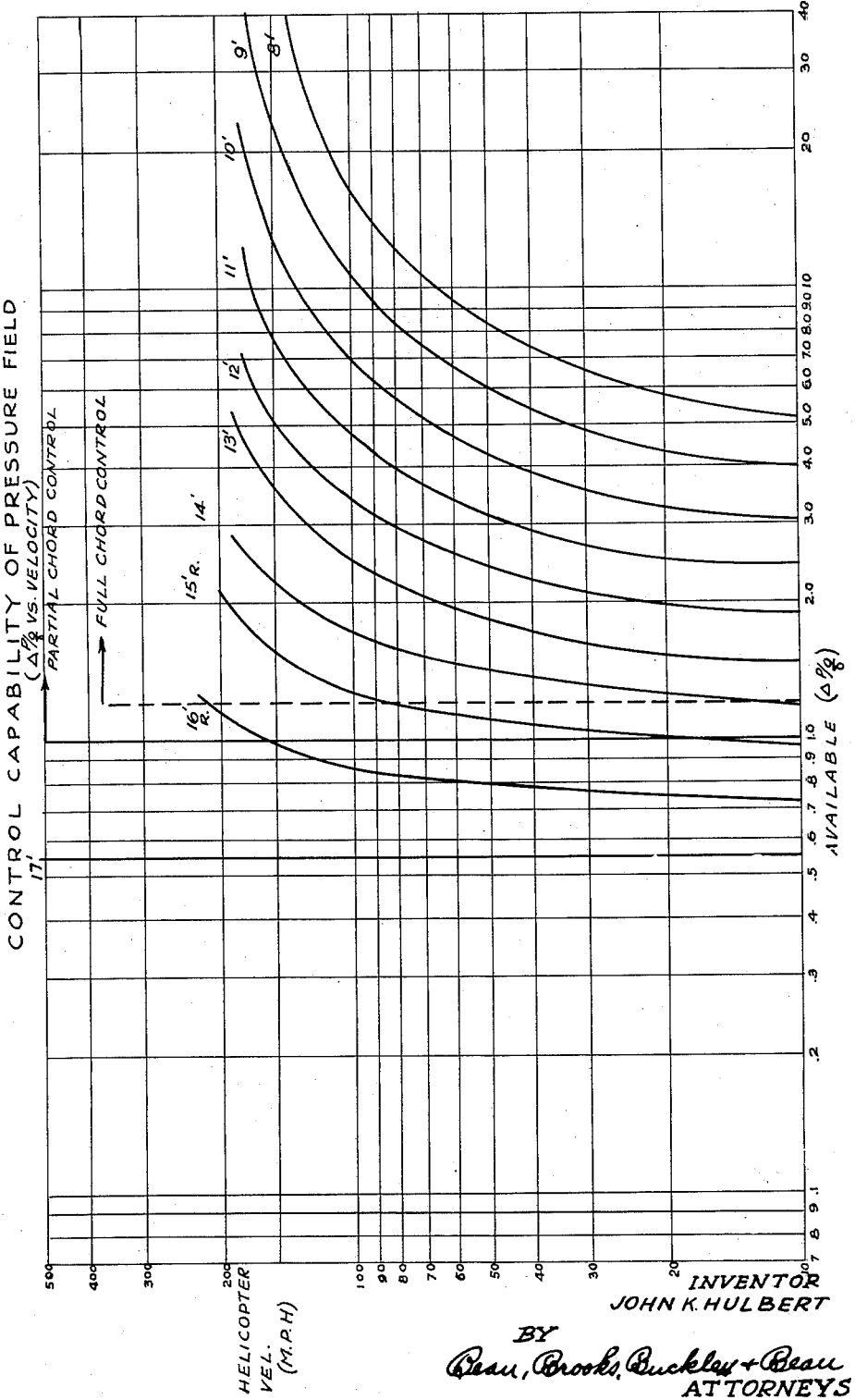

Referring now more particularly to FIGS. 1 and 2, the rotor blade 10 as shown therein may be constructed generally in accord with the principle set forth in co-pending application Serial No. 584,918 filed May 15, 1956, Now Patent 3,004,607 dated October 17, 1961, although it is to be understood that other and different forms of hollow rotor blades may be used, the same forming no part of the present invention. As shown, the blade comprises a metal leading edge member 12 of lightweight material such as aluminum and a trailing edge member 14, both of which extend in the spanwise direction from root to tip. An intermediate spanwise member 16 is also provided, having cover plates 18 and 20 associated therewith as shown. The skin structure of the blade 10 may comprise upper and lower sheets 22 and 24 as well as the external sheet 26 which is wrapped around as shown to cover both the upper and lower sheets 22 and 24 to thus provide a rigidified and smoothly continuous airfoil. For the sake of simplicity, the laminate skin structure adjacent the root of the blade is not illustrated in the drawings particularly since, as above specified, the exact structural configuration of the blade is immaterial.

In FIG. 1, the root end of the blade 10 is designated by reference character 28 and the tip end by reference character 30. It is to be understood that for the purposes of this invention, the root end 28 is closed while the tip end 30 remains open. Thus, the blade 10 takes the form of a hollow airfoil section having its inner or root end closed and its outer or tip end open so that a negative pressure gradient, from tip toward root, will exist as a result of blade rotation about an axis adjacent its root.

Since the forward flight speed will be limited by the maximum lift coefficient available, the present invention seeks to increase the maximum lift coefficient without such sacrifice in power as to render the device self defeating. Specifically, this is accomplished by providing air bleed openings 30 through the skin along the blade length to effect boundary layer control and thus increase the maximum lift coefficient.

Additionally, due to the typically high aspect ratio of helicopter main rotor blades, the induced drag represents a small part of the total power requirement while the form drag represents a large and material part of the total power requirement. Thus, reduction in form drag correspondingly reduces the power required to drive a given rotor and increases the weight lifted per horsepower. The above mentioned boundary layer control also decreases the form drag. Thus, the effect of the present invention is twofold; an increase in forward flight speed through increase in maximum lift coefficient and decrease in power requirement through reduction in form drag.

It will be appreciated that in order to achieve the full benefits of the present invention, the openings 30 will be of such size and spacing as to provide for most efficient operation. In regard to this, since nearly all the rotor work is accomplished between 50% and 100% rotor radius, no openings 30 are shown inwardly of the half way point, although it is to be understood that such could be used. Additionally, since the velocity of any point on the blade is in direct proportion to the radius at that point, in general, it is desirable to provide greater opening area per unit of blade area in the direction toward the tip. Further, distribution of the openings at the same radius may be varied in the chordwise direction, although it will be understood that this relationship is dependent primarily upon airfoil shape and for this reason is not specifically dealt with herein.

Referring now to FIG. 3, the data plotted therein represents the variation in the ratio $\Delta P/q$ at different airspeeds. The term $\Delta P$ is the differential in pressure at a particular radius between ambient pressure at the altitude considered and the internal pressure at the same radius existing by reason of the centrifugal pumping effect, whereas the term $q$ is the dynamic head required to achieve sufficient pumping action at the particular radius involved as a function of the effective or relative speed of the blade. In this regard, it is to be noted that the values of FIG. 3 are plotted for a blade at the point of maximum retreat (270° position). It has been found that for a $\Delta P/q$ ratio of 1.2 (or greater) the openings 30 are effective over the full chord width of the blade whereas such openings are effective only partially over the chord width in the region of the ratio between 1.0 and 1.2. These reference points are indicated by the vertical dotted lines in FIG. 3. Of course, for values of $\Delta P/q$ less than 1.0, the requisite pumping action cannot occur at the 270° blade position.

From FIG. 3, it will readily appear that in the speed range of 150 to 200 m.p.h., full chord pressure ratio is available out to 91% and 94% of the radius, as indicated by points A and B respectively. It will also appear that in those regions where the pressure ratio approaches the above noted critical value of 1.2, the greatest opening area is required, whereas in those regions of greater pressure ratio, increasingly smaller opening areas are required. This relationship is shown generally in FIG. 1 wherein it will be apparent that the opening area progressively increases toward the tip of the blade.

To better illustrate the aerodynamic improvements possible with the present invention, reference is had to FIG. 4. In this figure, coefficient of lift is plotted against coefficient of drag, curve c representing a blade provided with no openings 30, curve d representing the airfoil section drag with pumping, and curve e representing curve d with pumping power considered. From this figure, it will be seen that so long as the pumping power is maintained at a practical minimum, considerable gain in efficiency can be achieved. For example, with a conventional blade, curve c, when the coefficient of drag is 0.020, its lift is proportional to the $C_L$ of 1.26 (point F), while the blade according to this invention has a lift proportional to the $C_L$ of 1.92 at the same coefficient of drag (point G). Likewise, comparing the curves c and e for a coefficient of drag equal to 0.012, the coefficients of lift are 0.41 and 1.25 respectively (points H and I). These points of comparison represent an increase in lift of 205% and 52%, respectively, with the same section drag as that of a conventional rotor blade.

It is to be understood that certain changes and modifications as illustrated and described may be made without departing from the spirit of the invention or the scope of the following claims.

I claim:

1. In a helicopter, an elongate rotor blade having an outer skin of airfoil section presenting a hollow member along its length, said blade being adapted for rotation about a transverse axis adjacent the inner end thereof and being closed adjacent such end while being open at its opposite, outer end, whereby rotation of the blade as aforesaid will create a negative pressure gradient from its inner to its outer end, and said skin having openings therein increasing the available lift of said blade to permit increase in forward flight speed of a craft with which it is associated and to minimize retreating blade buffeting, said skin openings being of decreasing total area from the outer end of the blade toward said inner end thereof.

2. A rotor blade for helicopters characterized by its high available lift without material increase in driving power required, whereby to permit of increase in forward flight speed of a helicopter with which it is associated and minimization of retreating blade buffeting, said blade having an outer skin of airfoil section with the blade being hollow from its root to its tip, said blade being closed adjacent its root and open at its tip and being provided with perforations through said skin in at least that area between the 50% and 100% of its radius, said perforations being of decreasing total area toward the root end of the blade.

3. A rotor blade for helicopters characterized by its high available lift without material increase in driving power required, whereby to permit of increase in forward flight speed of a helicopter with which it as associated and minimization of retreating blade buffeting, said blade having an outer skin of airfoil section with the blade being hollow from its root to its tip, said blade being closed adjacent its root and open at its tip and being provided with perforations through said skin in at least that area between the 50% and 100% of its radius, said perforations being of decreasing total area toward the root of the blade such that the total area at any given radius is such as to produce substantially uniform air flow into the blade along its length in which the perforations exist.

References Cited in the file of this patent

UNITED STATES PATENTS

| 2,408,788 | Ludington et al. | Oct. 8, 1946 |
| 2,742,247 | Lachmann | Apr. 17, 1956 |
| 2,843,341 | Dannenberg | July 15, 1958 |

FOREIGN PATENTS

| 404,817 | Great Britain | Jan. 25, 1934 |